(12) United States Patent  
Zhang et al.

(10) Patent No.: US 10,975,658 B2  
(45) Date of Patent: Apr. 13, 2021

(54) WELLBORE ISOLATION BARRIER INCLUDING NEGATIVE THERMAL EXPANSION MATERIAL

(71) Applicants: Zhihui Zhang, Katy, TX (US); YingQing Xu, Tomball, TX (US); Zhiyue Xu, Cypress, TX (US)

(72) Inventors: Zhihui Zhang, Katy, TX (US); YingQing Xu, Tomball, TX (US); Zhiyue Xu, Cypress, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 0 days.

(21) Appl. No.: 16/415,650

(22) Filed: May 17, 2019

(65) Prior Publication Data

US 2020/0362662 A1    Nov. 19, 2020

(51) Int. Cl.
*E21B 33/134* (2006.01)
*C09K 8/46* (2006.01)

(52) U.S. Cl.
CPC .............. *E21B 33/134* (2013.01); *C09K 8/46* (2013.01)

(58) Field of Classification Search
CPC ................................ E21B 33/134; C09K 8/46
See application file for complete search history.

(56) References Cited

U.S. PATENT DOCUMENTS

| | | | |
|---|---|---|---|
| 3,115,932 A * | 12/1963 | Reynolds | E21B 43/025 175/4.52 |
| 3,208,530 A | 9/1965 | Allen et al. | |
| 3,768,563 A | 10/1973 | Blount | |
| 5,833,001 A * | 11/1998 | Song | E21B 33/13 166/287 |
| 5,967,122 A | 10/1999 | Muntzer et al. | |
| 6,132,676 A * | 10/2000 | Holzer | B22F 1/025 257/E23.009 |
| 6,237,688 B1 | 5/2001 | Burleson et al. | |

(Continued)

FOREIGN PATENT DOCUMENTS

| | | |
|---|---|---|
| CA | 2559226 A1 | 3/2008 |
| GB | 201705420 | 5/2017 |

(Continued)

OTHER PUBLICATIONS

Anonymous:"Silicone Injection Molding, Liquid Injection Molding(LIM)"; printed on May 16, 2019: pp. 2: http://usa.datwyler.com/liquid-injection-molding.html.

(Continued)

*Primary Examiner* — Silvana C Runyan  
(74) *Attorney, Agent, or Firm* — Cantor Colburn LLP

(57) ABSTRACT

A downhole tool for forming a seal in a wellbore includes a housing configured for attachment to a string usable to transport the tool in the wellbore to a target depth; a holding chamber disposed within the housing, the holding chamber configured to receive a combination of a metal, a metal oxide, and a negative thermal expansion material in the holding chamber; an initiator operable to initiate a chemical reaction; a pressure applicator configured to apply pressure to seal material in the holding chamber; and an opening in a surface of the housing through which the seal material is expellable from the holding chamber.

18 Claims, 2 Drawing Sheets

(56) References Cited

U.S. PATENT DOCUMENTS

| | | |
|---|---|---|
| 6,384,389 B1 | 5/2002 | Spencer |
| 6,474,414 B1 | 11/2002 | Gonzalez et al. |
| 6,664,522 B2 | 12/2003 | Spencer |
| 6,828,531 B2 | 12/2004 | Spencer |
| 6,923,263 B2 | 8/2005 | Eden et al. |
| 7,152,657 B2 | 12/2006 | Bosma et al. |
| 7,449,664 B2 | 11/2008 | Spencer |
| 7,455,104 B2 | 11/2008 | Duhon et al. |
| 7,640,965 B2 | 1/2010 | Bosma et al. |
| 7,934,552 B2 | 5/2011 | La Rovere |
| 8,201,610 B2 | 6/2012 | Stevens et al. |
| 8,662,169 B2 | 3/2014 | Cortez |
| 9,581,001 B2 | 2/2017 | Mazyar et al. |
| 9,708,882 B2 | 7/2017 | Carragher et al. |
| 10,053,950 B2 | 8/2018 | Carragher |
| 10,053,951 B2 | 8/2018 | Carragher et al. |
| 2007/0135550 A1 | 6/2007 | Chakrapani et al. |
| 2010/0006289 A1 | 1/2010 | Spencer |
| 2013/0087335 A1 | 4/2013 | Carragher et al. |
| 2015/0129221 A1 | 5/2015 | Mazyar et al. |
| 2015/0211327 A1 | 7/2015 | Lowry et al. |
| 2015/0345248 A1 | 12/2015 | Carragher |
| 2015/0368542 A1 | 12/2015 | Carragher |
| 2016/0251937 A1 | 9/2016 | Fripp |
| 2017/0030162 A1 | 2/2017 | Carragher |
| 2017/0218713 A1 | 8/2017 | Walton et al. |
| 2017/0226819 A1 | 8/2017 | Carragher |
| 2017/0234093 A1 | 8/2017 | Carragher |
| 2017/0234100 A1 | 8/2017 | Carragher |
| 2017/0247971 A1 | 8/2017 | Rivas Diaz |
| 2018/0094504 A1 | 4/2018 | Hearn et al. |

FOREIGN PATENT DOCUMENTS

| | | |
|---|---|---|
| GB | 201713517 | 10/2017 |
| WO | 2016161283 A1 | 10/2016 |
| WO | 2017191471 A1 | 11/2017 |
| WO | 2017203247 A1 | 11/2017 |
| WO | 2017203248 A1 | 11/2017 |

OTHER PUBLICATIONS

Anonymous: "Thermite Makes P&A right"; printed on May 16, 2019, pp. 3: https://www.innovoil.co.uk/single-post/2016/05/23/Thermite-makes-PA-right.

Anonymous: "Pressure Die Casting"; printed on May 16, 2019, pp. 1-6: https://www.themetalcasting.com/pressure-die-casting.html.

Holzer: "Phase Transformation and Thermal Expansion of CU/ZrW2O8 Metal Matrix Composites"; vol. 14, Mar. 1999; pp. 10.

DOE/Argonne National Laboratory, "Hybrid' Semiconductors Show Zero Thermal Expansion; Could Lead to Hardier Electronics", printed on Jan. 30, 2019, pp. 1-3:https://www.sciencedaily.com/releases/2007/12/071219122842.htm.

Divakar, MP. "Thermal Conductivity & CTE of Materials: Can We Engineer Them?", Electronics Cooling Online, Aug. 30, 2016, 8 pages.

Mortensen, Frank M., "Master's Thesis—A New P&A technology for setting the permanent barriers", University of Stavanger, (2016), 93 pages.

* cited by examiner

WELLBORE ISOLATION BARRIER INCLUDING NEGATIVE THERMAL EXPANSION MATERIAL

BACKGROUND

In the resource recovery industry it is common for a wellbore to contain multiple zones that have differing properties. Due to such properties and potentially different actions to enhance production of target fluids from the various zones, it is often desirable to create barriers downhole. Many kinds of barriers exist in the art such as packers, bridge plugs, etc. but they do not meet all of the varying needs of operators in some situations. Accordingly the art would well receive new barrier systems and methods.

SUMMARY

A downhole tool for forming a seal in a wellbore includes a housing configured for attachment to a string usable to transport the tool in the wellbore to a target depth; a holding chamber disposed within the housing, the holding chamber configured to receive a combination of a metal, a metal oxide, and a negative thermal expansion material in the holding chamber; an initiator operable to initiate a chemical reaction; a pressure applicator configured to apply pressure to seal material in the holding chamber; and an opening in a surface of the housing through which the seal material is expellable from the holding chamber.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
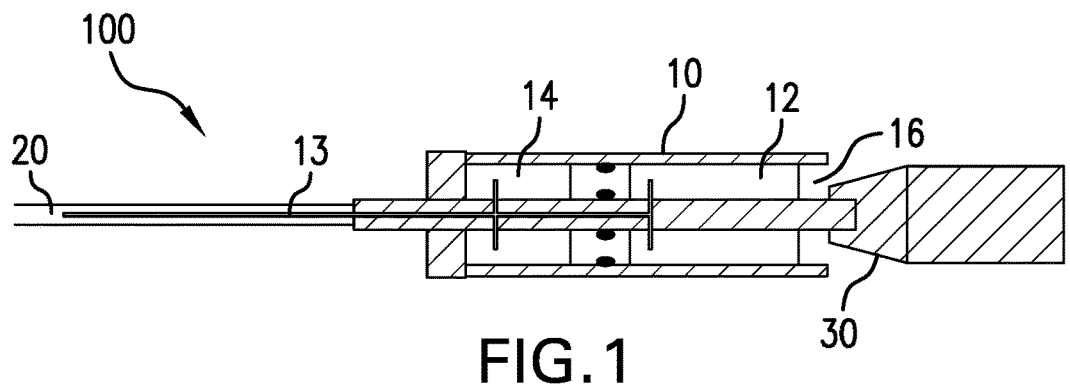
FIG. 1 illustrates an embodiment of a downhole tool.

Referring to FIG. 1, an embodiment of a downhole tool 100 for forming a seal disclosed herein is illustrated at 100. The downhole tool 100 is configured to function while in a borehole in a subsurface formation such as may be used in the fields of hydrocarbon recovery and carbon dioxide sequestration, for example.

The downhole tool 100 includes a housing 10 configured for attachment to a string 20 such as a wireline, for example, usable to transport the downhole tool 100 in the wellbore to a target depth. Disposed within the housing 10 is a holding chamber 12 configured to receive a combination of a metal, a metal oxide, and a negative thermal expansion material. The downhole tool 100 also includes an initiator operable to initiate a chemical reaction. A signal line 13 can convey a signal to initiate the reaction. The signal line 13 can be a part of or attached to the string 20.

The downhole tool 100 further includes a pressure applicator configured to apply pressure to seal material in the holding chamber 12. Pressurization of the seal material may improve mechanical performance of the seal material. For example, pressure applied to a deformable seal material in a semi-solid state may aid the seal material to fill crevices, voids, cracks, or a combination including at least one of the foregoing in the wellbore after expulsion from the downhole tool 100. The downhole tool 100 additionally includes an opening 16 in a surface of the housing 10 through which the seal material is expellable from the holding chamber 12.

Expulsion of the seal material from the holding chamber 12 may be assisted by pressure in pressure chamber 14. The pressure chamber 14 may include an energetic material that may generate gas and pressure. Gas and pressure may be generated by igniting the energetic material. The energetic material may include chemicals such as an oxidizing agent, fuel, binder, plasticizing agent, curing agent, stabilizing agent, cross-linking agent, or a combination including at least one of the foregoing. The oxidizing agent may include a perchlorate, nitrate, or a combination including at least one of the foregoing. The fuel may include carbon, sulfur, wood, aluminum, magnesium, or a combination including at least one of the foregoing.

As an example, the pressure in the pressure chamber 14 may be hydrostatic and therefore relatively automatic upon reaching a certain depth during running, or selective through the use of pressuring up from surface or other location or even a combination of hydrostatic and active pressurization. The pressure in the pressure chamber 14 may be provided by a mechanism that generates pressure such as an electrical motor. The pressure may be applied to the pressure applicator, which applies pressure to the seal material. A piston is an exemplary pressure applicator. Pressurization of the seal material may result in heated seal material being expelled from the holding chamber 12. The pressure applicator may be actuated mechanically. For example, pressure applied by a modulatable pressure source such as, in a wellbore for example, tubing pressure, annulus pressure or a dedicated pressure source, may act upon a piston that is housed within the pressure chamber 14. Upon application of pressure by the modulatable pressure source, the piston will cycle. Reduction of the applied pressure will allow the piston to return to a starting point.

Referring to FIG. 1, a seal block 30 may be employed to direct the seal material once the seal material has exited from the holding chamber 12. The seal block 30 may be ceramic, polymeric, glass, metal, or a combination including at least one of the foregoing. The seal block 30 may include a degradable material.

The seal block 30 may include an angled surface. The angled surface may direct the seal material upon being expelled through the opening 16 of the downhole tool 100. The angled surface may extend from the surface of the housing 10 of the downhole tool 100 including the opening 16 of the downhole tool 100.

Seal material expelled from the holding chamber 12 may be provided on and/or around a surface, for example, an outer surface, of the seal block 30. Solidified seal material may create a seal as well as an anchor in the wellbore.

Figure 2:
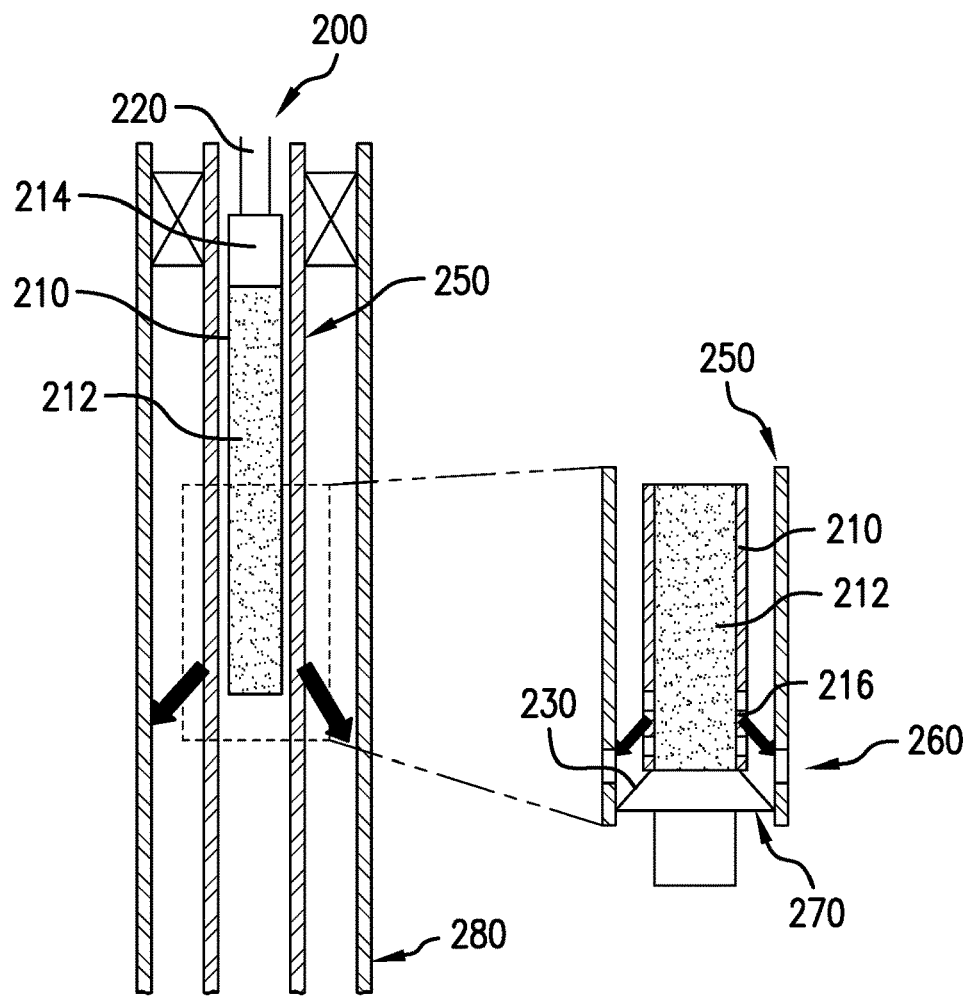
FIG. 2 illustrates an embodiment of a downhole tool within a wellbore.
Figure 3:
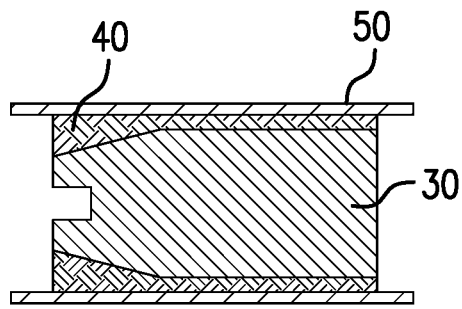
FIG. 3 illustrates an embodiment of a seal block of a downhole tool.

Referring to FIG. 2, an embodiment of a downhole tool 200 for forming a seal disclosed herein is illustrated at 200 within a wellbore. The downhole tool 200 is configured to function while in a borehole in a subsurface formation such as may be used in the fields of hydrocarbon recovery and carbon dioxide sequestration, for example.

Similar to the downhole tool 100 illustrated in FIG. 1, the downhole tool 200 includes a housing 210 configured for attachment to a string 220 such as a wireline, for example, usable to transport the downhole tool 200 in the wellbore to a target depth. Disposed within the housing 210 is a holding chamber 212 configured to receive a combination of a metal, a metal oxide, and a negative thermal expansion material. The downhole tool 200 also includes an initiator operable to initiate a chemical reaction. A signal line can convey a signal to initiate the reaction. The signal line can be a part of or attached to the string 220.

The downhole tool 200 further includes a pressure applicator configured to apply pressure to seal material in the holding chamber 212. Pressurization of the seal material may improve mechanical performance of the seal material. For example, pressure applied to a deformable seal material in a semi-solid state may aid the seal material to fill crevices, voids, cracks, or a combination including at least one of the foregoing in the wellbore after expulsion from the downhole tool 200. The downhole tool 200 additionally includes an opening 216 in a surface of the housing 210 through which the seal material is expellable from the holding chamber 212.

Expulsion of the seal material from the holding chamber 212 may be assisted by pressure in pressure chamber 214. The pressure chamber 214 may include an energetic material that may generate gas and pressure. Gas and pressure may be generated by igniting the energetic material. The energetic material may include chemicals such as an oxidizing agent, fuel, binder, plasticizing agent, curing agent, stabilizing agent, cross-linking agent, or a combination including at least one of the foregoing. The oxidizing agent may include a perchlorate, nitrate, or a combination including at least one of the foregoing. The fuel may include carbon, sulfur, wood, aluminum, magnesium, or a combination including at least one of the foregoing.

As an example, the pressure in the pressure chamber 214 may be hydrostatic and therefore relatively automatic upon reaching a certain depth during running, or selective through the use of pressuring up from surface or other location or even a combination of hydrostatic and active pressurization. The pressure in the pressure chamber 214 may be provided by a mechanism that generates pressure such as an electrical motor. The pressure may be applied to the pressure applicator, which applies pressure to the seal material. A piston is an exemplary pressure applicator. Pressurization of the seal material may result in heated seal material being expelled from the holding chamber 212. The pressure applicator may be actuated mechanically. For example, pressure applied by a modulatable pressure source such as, in a wellbore for example, tubing pressure, annulus pressure or a dedicated pressure source, may act upon a piston that is housed within the pressure chamber 214. Upon application of pressure by the modulatable pressure source, the piston will cycle. Reduction of the applied pressure will allow the piston to return to a starting point.

Referring to FIG. 2, a seal block 230 may be employed to direct the seal material once the seal material has exited from the holding chamber 212. The seal block 230 may be ceramic, polymeric, glass, metal, or a combination including at least one of the foregoing. The seal block 230 may include a degradable material.

The seal block 230 may include an angled surface. The angled surface may direct the seal material upon being expelled through the opening 216 of the downhole tool 200. The angled surface may extend from the surface of the housing 210 of the downhole tool 200 including the opening 216 of the downhole tool 200.

Differing from to the downhole tool 100 illustrated in FIG. 1, a first end of the angled surface may extend from the housing 210 of the downhole tool 200 and a second end of the angled surface may contact a surface in the wellbore, for example, a surface of tubing 250 in the wellbore. The downhole tool 200 may further include a perforator 270 configured to form perforations 260 in the surface in the wellbore contacting the second end of the angled surface. The surface in the wellbore contacting the second end of the angled surface may be the surface of the tubing 250 in the wellbore. Seal material expelled from the housing 210 may penetrate an annulus between the tubing 250 in the wellbore and casing 280 in the wellbore and the annulus between the tubing 250 and the casing 280 may be stabilized. For example, seal material expelled from the housing 210 may flow through the perforations 260 in the tubing 250 placed or punched by the perforator 270 at the bottom of the downhole tool 200, and the annulus between the tubing 250 and the casing 280 may be stabilized. In particular, fluid in the annulus may be replaced with seal material, thus creating a casing-exit window with stabilization support.

The present inventors have found that a seal material including a Negative Thermal Expansion (NTE) material forms a tight seal. In particular, the NTE material expands during solidification and cooling. As used herein, "solidification" refers to a phase change of matter that results in the production of a solid, and "cooling" (or "cooled") refers to a decrease in temperature from a solidification temperature. For example, a solidified seal material including an NTE material may be cooled to a wellbore working temperature.

Provided is a method in which an exothermal thermite composition is configured as an in-situ constituent to exothermally react to thereby heat an NTE material. As used herein, a "thermite composition" refers to a composition of a metal and metal oxide that undergoes an exothermic redox reaction when ignited by heat. The metal may be in the form of a metal powder. The exothermic redox reaction is also called a "thermite reaction". The thermite composition produces heat as a result of a non-detonative exothermic chemical reaction that does not rely on oxygen from an external source to sustain the thermite reaction.

The thermite reaction may be initiated by an initiation device that may increase a temperature of a portion of the thermite composition through electrical means, chemical means, or a combination including at least one of the foregoing. The initiation device may be a heating device, which may contact the thermite composition, initiating the thermite reaction.

A number of metals may function as a reducing agent in the thermite reaction to reduce the metal oxide. If aluminum is the reducing agent, the thermite reaction is called an aluminothermic reaction. A thermite reaction is also named after the oxide participating in the reaction, such as iron thermite (either $Fe_2O_3$ or $Fe_3O_4$). At the stoichiometric ratio, the thermite reaction may create short bursts of extremely high temperatures focused on a very small area for a short period of time. Thermite reaction temperatures may reach as high as 3,000° C., and can thereby effectively serve as a heating source for heating a Negative Thermal Expansion (NTE) material as will be described further below.

The holder chamber 12 is configured to receive a combination of a thermite composition, an excess reducing metal or a non-reaction participating metal, such as Al, Mg, Ti, Zn, Sn, Pb, Ag, Bi, Fe, Ni, Cu, Na, Si, B, or a combination including at least one of the foregoing. Reaction of Al, Mg, Ti, or a combination including at least one of the foregoing with a metal oxide releases a relatively larger amount of heat. The excess or non-reaction participating metal is added to the holder chamber 12 to adjust the heat release of the thermite composition and the properties of the seal material, or a combination including at least one of the foregoing. For example, inclusion of Zn, Sn, Bi, Cu, Fe, Ni, or a combination in the thermite composition may help control the thermite reaction temperature, provide the seal material with desired mechanical properties, or a combination including at least one of the foregoing.

The metal oxide for example, oxidizing agent, of the thermite composition may include boron oxide, silicon oxide, chromium oxide, manganese oxide, iron oxide, copper oxide, lead oxide, molybdenum oxide, titanium oxide, vanadium oxide, bismuth oxide, silver oxide, zinc oxide, tin oxide, or a combination including at least one of the foregoing. The thermite reaction reduces the metal oxide to a metal. For example, CuO is reduced to Cu, $Ag_2O$ is reduced to Ag, or a combination including at least one of the foregoing.

Table 1 includes exemplary thermite reactions.

TABLE 1

| Thermite reaction |
|---|
| $2Al + Fe_2O_3 \rightarrow 2Fe + Al_2O_3$ |
| $2Al + Bi_2O_3 \rightarrow 2Bi + Al_2O_3$ |
| $2Al + MoO_3 \rightarrow Mo + Al_2O_3$ |
| $2Al + 3CuO \rightarrow 3Cu + Al_2O_3$ |
| $3Mg + Fe_2O_3 \rightarrow 2Fe + 3MgO$ |
| $3Ti + 2Fe_2O_3 \rightarrow 3TiO_2 + 4Fe$ |

A holding chamber 12 of the downhole tool 100 for forming a seal in a wellbore disclosed herein further includes an NTE material. As used herein the phrase "seal material" refers to a combination of thermite composition and NTE material for forming a seal in a wellbore. As used herein the phrase "Negative Thermal Expansion material" or "NTE material" refers to a materials that contract upon heating under constant pressure and expands upon solidification. An NTE material expands upon cooling, i.e., with a decrease in temperature from the solidification temperature of the NTE material. For NTE materials, $\alpha$ is negative in the following equation.

$$\alpha = (1/L)(dL/dT),$$

wherein L is the sample dimension and T is the sample temperature.

The NTE material may penetrate, conformably fill, or prevent the occurrence of crevices, voids, cracks, or a combination including at least one of the foregoing in the wellbore, harden in place to form a seal, and expand after solidification to create a device with sealing and anchoring capabilities. A temperature increase and extent of negative thermal expansion of the NTE material may be controlled by selection of the NTE material and relative amounts of the metal, metal oxide, and NTE material. The holder chamber 12 can be configured to receive 5 volume % to 85 volume %, for example, 25 volume % to 75 volume %, of NTE material; 5 volume % to 90 volume %, for example, 10 volume % to 70 volume %, of metal; and 5 volume % to 80 volume %, for example, 10 volume % to 60 volume %, of metal oxide, based on a total volume of NTE material, metal, and metal oxide in the holding chamber 12.

The NTE material may include $A^1M^1{}_2O_8$, wherein $A^1$ is Zr or Hf and $M^1$ is Mo or W;

$A^2P_2O_7$, wherein $A^2$ is Zr, Hf, Ti, U, Th, Pu, Np, Mo, W, Ce, Pb, Sn, Ge or Si;

$A^3V_2O_7$, wherein $A^3$ is Zr or Hf;

$A^4As_2O_7$, wherein $A^4$ is Zr or Hf;

$A^5{}_2M^2{}_3O_{12}$, wherein $A^5$ is Al, Sb, Bi, Co, Ga, Au, Fe, Sc, Ti, Y, Ho, or Yb and $M^2$ is Mo or W;

$PbTiO_3$, $(Bi,La)NiO_3$, $LaCu_3Fe_4O_{12}$, or a combination including at least one of the foregoing;

$Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing;

$LiAlSiO_4$, $Mg_2Al_4Si_5O_{18}$, or a combination including at least one of the foregoing;

$Fe_3Pt$;

$Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing;

$Tm_2Fe_{16}Cr$;

a Ni—Ti alloy, a Ni—Ti—Pd alloy, a Co—Ni—Ga alloy, or a combination including at least one of the foregoing; or a combination including at least one of the foregoing.

The NTE material in the holding chamber 12 of the downhole tool 100 may initially be in a powdered form or in the form of a powder compact. Examples of the metal, the metal oxide, and the negative thermal expansion material to be received in the holding chamber 12 include Al, $Fe_2O_3$, and $ZrW_2O_8$;

Al, $MnO_2$, and $Al_2W_3O_{12}$;

Mg, $MnO_2$, and $Al_2W_3O_{12}$; or

Mn, CuO, and $Al_2W_3O_{12}$.

The thermite reaction propagates and heats the NTE material by providing heat throughout the seal material, at least a portion of which is expelled from the holding chamber 12. The seal material may be expelled from the holding chamber 12 by application of pressure, and may be expelled to a target annulus or space to be filled with the seal material. At least a portion of the seal material may be expelled from the holding chamber 12 in a substantially horizontal direction.

The seal material may be in a solid state, in a liquid state, or in a semi-solid state when expelled from the holding chamber 12 of the downhole tool 100. As used herein, "semi-solid state" refers to a phase at a temperature between the solidus temperature and the liquidus or melting temperature of the seal material. The seal material may be consolidated or sintered by the in-situ exothermal reaction temperature, for example, when the seal material temperature is in a range of 0.5 $T_m$ to $T_m$, wherein $T_m$ is the melting temperature of the seal material. The reaction temperature is controlled by appropriate selection of the thermite composition, non-reaction participating metals, and NTE material and may heat the seal material such that the seal material is deformable to fill gaps, openings, crevices, voids, cracks, or a combination including at least one of the foregoing in the wellbore.

With further reference to FIG. 1, in operation, after a pressure applicator applies pressure to heated seal material to help expel the heated seal material from the holding chamber 12, the pressure applicator may contact a surface of the seal block 30. Pressure between the pressure applicator and the seal block 30 may help shear a connection between the seal block 30 and a remainder of the tool 100 and seal block 30 may be released from the remainder of the tool 100.

Figure 4:
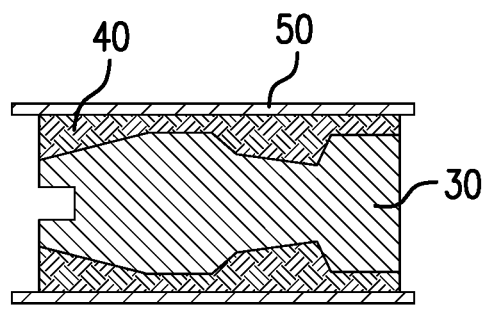
FIG. 4 illustrates an embodiment of a seal block of a downhole tool.
Figure 5:
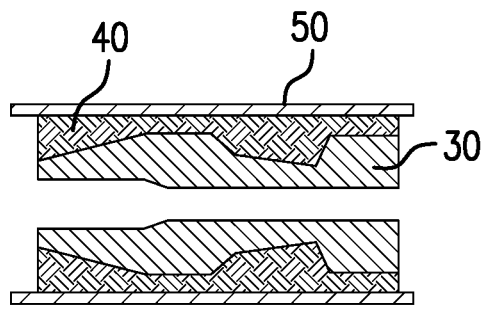
FIG. 5 illustrates an embodiment of a seal block of a downhole tool.
Figure 6:
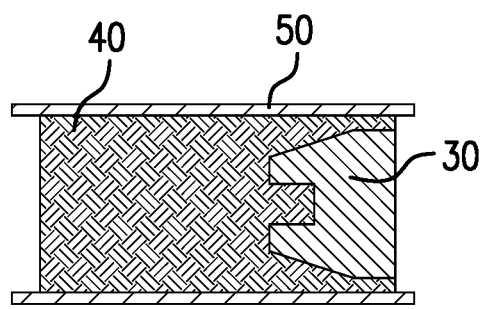
FIG. 6 illustrates an embodiment of a seal block of a downhole tool.

As shown in FIG. 3, FIG. 4, FIG. 5, and FIG. 6, the seal block 30 may have different features for different application purposes. For example, with reference to FIG. 3, an outer diameter of the seal block 30 may be constant to form a bridge plug with seal material 40 between the seal block 30 and a surface 50 in the wellbore. With reference to FIG. 4, the seal block 30 an outer diameter of the seal block 30 may vary to provide a profile on the outer surface of the seal block 30 to enhance anchoring of the seal block 30 in the wellbore, with seal material 40 between the seal block 30 and a surface 50 in the wellbore. With reference to FIG. 5, the seal block 30 may have a flow-through inner channel and a seat to receive a ball together to create a frac plug. The frac plug can include a dissolvable material such as disintegrating frac balls including a corrodible electrolytic metallic material. With reference to FIG. 6, the seal block 30 may have a relatively simple form positionable at an end, for example, a bottom, of a wellbore. Additional sealing material such as cement can be placed upon the seal material 40.

One or more plugs may form a portion of the holding chamber 12 to maintain sealing integrity of the holding chamber 12 until a selected condition is reached. For example, the one or more plugs can be meltable above a selected temperature, and once the selected temperature is reached, the one or more meltable plugs may be breached and the seal material may be expelled from the holding chamber 12 through the opening 16 in the surface of the housing 10.

Set forth below are some embodiments of the foregoing disclosure:

Embodiment 1: A downhole tool for forming a seal in a wellbore comprising: a housing configured for attachment to a string usable to transport the tool in the wellbore to a target depth; a holding chamber disposed within the housing, the holding chamber configured to receive a combination of a metal, a metal oxide, and a negative thermal expansion material in the holding chamber; an initiator operable to initiate a chemical reaction; a pressure applicator configured to apply pressure to seal material in the holding chamber; and an opening in a surface of the housing through which the seal material is expellable from the holding chamber.

Embodiment 2: The tool as in any prior embodiment, wherein the negative thermal expansion material comprises: $A^1M^1_2O_8$, wherein $A^1$ is Zr or Hf and $M^1$ is Mo or W; $A^2P_2O_7$, wherein $A^2$ is Zr, Hf, Ti, U, Th, Pu, Np, Mo, W, Ce, Pb, Sn, Ge or Si; $A^3V_2O_7$, wherein $A^3$ is Zr or Hf; $A^4As_2O_7$, wherein $A^4$ is Zr or Hf; $A^5_2M^2_3O_{12}$, wherein $A^5$ is Al, Sb, Bi, Co, Ga, Au, Fe, Sc, Ti, Y, Ho, or Yb and $M^2$ is Mo or W; $PbTiO_3$, $(Bi,La)NiO_3$, $LaCu_3Fe_4O_{12}$, or a combination including at least one of the foregoing; $Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing; $LiAlSiO_4$, $Mg_2Al_4Si_5O_{18}$, or a combination including at least one of the foregoing; $Fe_3Pt$; $Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing; $Tm_2Fe_{16}Cr$; a Ni—Ti alloy, a Ni—Ti—Pd alloy, a Co—Ni—Ga alloy, or a combination including at least one of the foregoing; or a combination including at least one of the foregoing.

Embodiment 3: The tool as in any prior embodiment, wherein the pressure applicator is further configured to expel the seal material from the holding chamber.

Embodiment 4: The tool as in any prior embodiment, further comprising a pressure chamber configured to actuate the pressure applicator.

Embodiment 5: The tool as in any prior embodiment, wherein the pressure applicator is configured to be actuated by gas generated in the pressure chamber.

Embodiment 6: The tool as in any prior embodiment, wherein the pressure applicator is configured to expel the seal material at a temperature between a solidus temperature and a liquidus temperature of the seal material.

Embodiment 7: The tool as in any prior embodiment, wherein the tool further comprises a seal block configured to direct flow of the seal material expelled from the holding chamber, the seal block comprising an angled surface extending from the surface of the housing comprising the opening.

Embodiment 8: The tool as in any prior embodiment, wherein the seal block is releasable from a remainder of the tool.

Embodiment 9: The tool as in any prior embodiment, wherein a first end of the angled surface extends from the housing and a second end of the angled surface contacts a surface in the wellbore.

Embodiment 10: The tool as in any prior embodiment, further comprising a perforator configured to form openings in the surface in the wellbore contacting the second end of the angled surface.

Embodiment 11: A method of forming a seal material in a wellbore using the tool as in any prior embodiment, the method comprising: initiating the chemical reaction; and forming the seal material by the chemical reaction.

Embodiment 12: The method as in any prior embodiment, wherein the negative thermal expansion material comprises: $A^1M^1_2O_8$, wherein $A^1$ is Zr or Hf and $M^1$ is Mo or W; $A^2P_2O_7$, wherein $A^2$ is Zr, Hf, Ti, U, Th, Pu, Np, Mo, W, Ce, Pb, Sn, Ge or Si; $A^3V_2O_7$, wherein $A^3$ is Zr or Hf; $A^4As_2O_7$, wherein $A^4$ is Zr or Hf; $A^5_2M^2_3O_{12}$, wherein $A^5$ is Al, Sb, Bi, Co, Ga, Au, Fe, Sc, Ti, Y, Ho, or Yb and $M^2$ is Mo or W; $PbTiO_3$, $(Bi,La)NiO_3$, $LaCu_3Fe_4O_{12}$, or a combination including at least one of the foregoing; $Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing; $LiAlSiO_4$, $Mg_2Al_4Si_5O_{18}$, or a combination including at least one of the foregoing; $Fe_3Pt$; $Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing; $Tm_2Fe_{16}Cr$; a Ni—Ti alloy, a Ni—Ti—Pd alloy, a Co—Ni—Ga alloy, or a combination including at least one of the foregoing; or a combination including at least one of the foregoing.

Embodiment 13: The method as in any prior embodiment, further comprising actuating the pressure applicator to apply pressure to the seal material in the holding chamber.

Embodiment 14: The method as in any prior embodiment, wherein: the tool further comprises a pressure chamber configured to actuate the pressure applicator; and actuating the pressure applicator comprises generating gas in the pressure chamber.

Embodiment 15: The method as in any prior embodiment, wherein actuating the pressure applicator expels the seal material at a temperature between a solidus temperature and a liquidus temperature of the seal material from the holding chamber.

Embodiment 16: The method as in any prior embodiment, wherein actuating the pressure applicator expels the seal material at a temperature less than a solidus temperature of the seal material or greater than a liquidus temperature of the seal material from the holding chamber.

Embodiment 17: A method of forming a seal in a wellbore, the method comprising: forming a seal material by the method as in any prior embodiment; and expelling at least a portion of the seal material from the holding chamber to form the seal.

Embodiment 18: The method as in any prior embodiment, wherein the negative thermal expansion material comprises: $A^1M^1_2O_8$, wherein $A^1$ is Zr or Hf and $M^1$ is Mo or W; $A^2P_2O_7$, wherein $A^2$ is Zr, Hf, Ti, U, Th, Pu, Np, Mo, W, Ce, Pb, Sn, Ge or Si; $A^3V_2O_7$, wherein $A^3$ is Zr or Hf; $A^4As_2O_7$, wherein $A^4$ is Zr or Hf; $A^5_2M^2_3O_{12}$, wherein $A^5$ is Al, Sb, Bi, Co, Ga, Au, Fe, Sc, Ti, Y, Ho, or Yb and $M^2$ is Mo or W; $PbTiO_3$, $(Bi,La)NiO_3$, $LaCu_3Fe_4O_{12}$, or a combination including at least one of the foregoing; $Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing; $LiAlSiO_4$, $Mg_2Al_4Si_5O_{18}$, or a combination including at least one of the foregoing; $Fe_3Pt$; $Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing; $Tm_2Fe_{16}Cr$; a Ni—Ti alloy, a Ni—Ti—Pd alloy, a Co—Ni—Ga alloy, or a combination including at least one of the foregoing; or a combination including at least one of the foregoing.

Embodiment 19: The method as in any prior embodiment, wherein expelling at least a portion of the seal material from the holding chamber comprises expelling at least a portion of the seal material from the holding chamber in a substantially horizontal direction.

Embodiment 20: The method as in any prior embodiment, wherein: the tool further comprises a seal block configured to direct flow of the seal material from the holding chamber into an annulus between tubing in the wellbore and casing in the wellbore; the pressure applicator is further configured to expel the seal material from the holding chamber; and pressure between the pressure applicator and the seal block releases the seal block from a remainder of the tool.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers, etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A downhole tool for forming a seal in a wellbore comprising:
a housing configured for attachment to a string usable to transport the tool in the wellbore to a target depth;
a holding chamber disposed within the housing, the holding chamber configured to receive a seal material which comprises a combination of a metal, a metal oxide, and a negative thermal expansion material in the holding chamber;
an initiator operable to initiate a chemical reaction;
a pressure applicator configured to apply pressure to the seal material in the holding chamber; and
an opening in a surface of the housing through which the seal material is expellable from the holding chamber,
wherein the tool further comprises a seal block configured to direct flow of the seal material expelled from the holding chamber, the seal block comprising an angled surface extending from the surface of the housing comprising the opening.

2. The tool as claimed in claim 1, wherein the negative thermal expansion material comprises:
$A^1M^1_2O_8$, wherein $A^1$ is Zr or Hf and $M^1$ is Mo or W;
$A^2P_2O_7$, wherein $A^2$ is Zr, Hf, Ti, U, Th, Pu, Np, Mo, W, Ce, Pb, Sn, Ge or Si;
$A^3V_2O_7$, wherein $A^3$ is Zr or Hf;
$A^4As_2O_7$, wherein $A^4$ is Zr or Hf;
$A^5_2M^2_3O_{12}$, wherein $A^5$ is Al, Sb, Bi, Co, Ga, Au, Fe, Sc, Ti, Y, Ho, or Yb and $M^2$ is Mo or W;
$PbTiO_3$, $(Bi,La)NiO_3$, $LaCu_3Fe_4O_{12}$, or a combination including at least one of the foregoing;
$Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing;
$LiAlSiO_4$, $Mg_2Al_4Si_5O_{18}$, or a combination including at least one of the foregoing;
$Fe_3Pt$;
$Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing;
$Tm_2Fe_{16}Cr$;
a Ni—Ti alloy, a Ni—Ti—Pd alloy, a Co—Ni—Ga alloy, or a combination including at least one of the foregoing; or
a combination including at least one of the foregoing.

3. The tool as claimed in claim 1, wherein the pressure applicator is further configured to expel the seal material from the holding chamber.

4. The tool as claimed in claim 3, further comprising a pressure chamber configured to actuate the pressure applicator.

5. The tool as claimed in claim 4, wherein the pressure applicator is configured to be actuated by gas generated in the pressure chamber.

6. The tool as claimed in claim 3, wherein the pressure applicator is configured to expel the seal material at a temperature between a solidus temperature and a liquidus temperature of the seal material.

7. The tool as claimed in claim 1, wherein the seal block is releasable from a remainder of the tool.

8. The tool as claimed in claim 1, wherein a first end of the angled surface extends from the housing and a second end of the angled surface contacts a surface in the wellbore.

9. The tool as claimed in claim 8, further comprising a perforator configured to form openings in the surface in the wellbore contacting the second end of the angled surface.

10. A method of forming a seal material in a wellbore using the tool as claimed in claim 1, the method comprising:
   initiating the chemical reaction; and
   forming the seal material by the chemical reaction, wherein
   the tool further comprises a pressure chamber configured to actuate the pressure applicator; and
   the method further comprises actuating the pressure applicator comprises generating gas in the pressure chamber.

11. The method as claimed in claim 10, wherein the negative thermal expansion material comprises:
   $A^1M^1_2O_8$, wherein $A^1$ is Zr or Hf and $M^1$ is Mo or W;
   $A^2P_2O_7$, wherein $A^2$ is Zr, Hf, Ti, U, Th, Pu, Np, Mo, W, Ce, Pb, Sn, Ge or Si;
   $A^3V_2O_7$, wherein $A^3$ is Zr or Hf;
   $A^4As_2O_7$, wherein $A^4$ is Zr or Hf;
   $A^5_2M^2_3O_{12}$, wherein $A^5$ is Al, Sb, Bi, Co, Ga, Au, Fe, Sc, Ti, Y, Ho, or Yb and $M^2$ is Mo or W;
   $PbTiO_3$, $(Bi,La)NiO_3$, $LaCu_3Fe_4O_{12}$, or a combination including at least one of the foregoing;
   $Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing;
   $LiAlSiO_4$, $Mg_2Al_4Si_5O_{18}$, or a combination including at least one of the foregoing;
   $Fe_3Pt$;
   $Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing;
   $Tm_2Fe_{16}Cr$;
   a Ni—Ti alloy, a Ni—Ti—Pd alloy, a Co—Ni—Ga alloy, or a combination including at least one of the foregoing; or
   a combination including at least one of the foregoing.

12. The method as claimed in claim 10, wherein actuating the pressure applicator expels the seal material at a temperature between a solidus temperature and a liquidus temperature of the seal material from the holding chamber.

13. The method as claimed in claim 10, wherein actuating the pressure applicator expels the seal material at a temperature less than a solidus temperature of the seal material or greater than a liquidus temperature of the seal material from the holding chamber.

14. A method of forming a seal in a wellbore, the method comprising:
   forming a seal material by the method as claimed in claim 10; and
   expelling at least a portion of the seal material from the holding chamber to form the seal.

15. The method as claimed in claim 14, wherein the negative thermal expansion material comprises:
   $A^1M^1_2O_8$, wherein $A^1$ is Zr or Hf and $M^1$ is Mo or W;
   $A^2P_2O_7$, wherein $A^2$ is Zr, Hf, Ti, U, Th, Pu, Np, Mo, W, Ce, Pb, Sn, Ge or Si;
   $A^3V_2O_7$, wherein $A^3$ is Zr or Hf;
   $A^4As_2O_7$, wherein $A^4$ is Zr or Hf;
   $A^5_2M^2_3O_{12}$, wherein $A^5$ is Al, Sb, Bi, Co, Ga, Au, Fe, Sc, Ti, Y, Ho, or Yb and $M^2$ is Mo or W;
   $PbTiO_3$, $(Bi,La)NiO_3$, $LaCu_3Fe_4O_{12}$, or a combination including at least one of the foregoing;
   $Fe(Co(CN)_6)$, $Zn_3(Fe(CN)_6)_2$, $Ag_3(Co(CN)_6)$, $Cd(CN)_2$, $Co_3(Co(CN)_6)_2$, $Mn_3(Co(CN)_6)_2$, or a combination including at least one of the foregoing;
   $LiAlSiO_4$, $Mg_2Al_4Si_5O_{18}$, or a combination including at least one of the foregoing;
   $Fe_3Pt$;
   $Mn_3ZnN$, $Mn_3GaN$, $Mn_3Cu_{0.53}Ge_{0.47}N$, $Mn_3Zn_{0.5}Sn_{0.5}N_{0.85}C_{0.1}B_{0.05}$, $Mn_3Zn_{0.4}Sn_{0.6}N_{0.85}C_{0.15}$, or a combination including at least one of the foregoing;
   $Tm_2Fe_{16}Cr$;
   a Ni—Ti alloy, a Ni—Ti—Pd alloy, a Co—Ni—Ga alloy, or a combination including at least one of the foregoing; or
   a combination including at least one of the foregoing.

16. The method as claimed in claim 14, wherein expelling at least a portion of the seal material from the holding chamber comprises expelling at least a portion of the seal material from the holding chamber in a substantially horizontal direction.

17. The method as claimed in claim 14, wherein:
   the tool further comprises a seal block configured to direct flow of the seal material from the holding chamber into an annulus between tubing in the wellbore and casing in the wellbore;
   the pressure applicator is further configured to expel the seal material from the holding chamber; and
   pressure between the pressure applicator and the seal block releases the seal block from a remainder of the tool.

18. A downhole tool for forming a seal in a wellbore comprising:
   a housing configured for attachment to a string usable to transport the tool in the wellbore to a target depth;
   a holding chamber disposed within the housing, the holding chamber configured to receive a combination of a metal, a metal oxide, and a negative thermal expansion material in the holding chamber;
   an initiator operable to initiate a chemical reaction;
   a pressure applicator configured to apply pressure to seal material in the holding chamber, and to expel the seal material from the holding chamber; and
   an opening in a surface of the housing through which the seal material is expellable from the holding chamber
   wherein the downhole tool further comprises a pressure chamber configured to actuate the pressure applicator, and the pressure applicator is configured to be actuated by gas generated in the pressure chamber.

* * * * *